(12) United States Patent
Wang et al.

(10) Patent No.: US 11,119,618 B2
(45) Date of Patent: Sep. 14, 2021

(54) SUBSTRATE AND TOUCH DISPLAY APPARATUS

(71) Applicants: BOE Technology Group Co., Ltd., Beijing (CN); HEFEI BOE OPTOELECTRONICS TECHNOLOGY CO., LTD., Anhui (CN)

(72) Inventors: Ying Wang, Beijing (CN); Hongmin Li, Beijing (CN); Dong Wang, Beijing (CN); Zhifu Dong, Beijing (CN); Jian Tao, Beijing (CN); Li Sun, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 587 days.

(21) Appl. No.: 16/081,513

(22) PCT Filed: Apr. 9, 2018

(86) PCT No.: PCT/CN2018/082337
§ 371 (c)(1),
(2) Date: Aug. 31, 2018

(87) PCT Pub. No.: WO2019/037434
PCT Pub. Date: Feb. 28, 2019

(65) Prior Publication Data
US 2021/0216170 A1 Jul. 15, 2021

(30) Foreign Application Priority Data
Aug. 25, 2017 (CN) .......................... 201710740200.4

(51) Int. Cl.
*G06F 3/044* (2006.01)
*G06F 3/041* (2006.01)

(52) U.S. Cl.
CPC ........ *G06F 3/0448* (2019.05); *G06F 3/04166* (2019.05)

(58) Field of Classification Search
CPC .......................... G06F 3/0448; G06F 3/04166
See application file for complete search history.

(56) References Cited

U.S. PATENT DOCUMENTS 9,529,482 B2  12/2016  Liu et al.
9,823,789 B2  11/2017  Ding et al.
(Continued)

FOREIGN PATENT DOCUMENTS

CN   103218097 A   7/2013
CN   103970392 A   8/2014
(Continued)

OTHER PUBLICATIONS

Office Action dated Nov. 29, 2019, issued in counterpart CN Application No. 201710740200.4, with English translation (13 pages).
(Continued)

*Primary Examiner* — Amit Chatly
(74) *Attorney, Agent, or Firm* — Westerman, Hattori, Daniels & Adrian, LLP (57) ABSTRACT

The present disclosure is related to a substrate. The substrate may include a plurality of electrode patterns. Each of the plurality of the electrode patterns may include a first electrode and a plurality of second electrodes connected to the first electrode. A shape of second electrodes of an electrode pattern may be complementary to a shape of second electrodes of at least one electrode pattern adjacent to the electrode pattern.

17 Claims, 6 Drawing Sheets

(56) References Cited

U.S. PATENT DOCUMENTS

| | | | |
|---|---|---|---|
| 9,933,899 B2 | 4/2018 | Yang et al. | |
| 9,965,115 B2 | 5/2018 | Ye et al. | |
| 2013/0088459 A1* | 4/2013 | Yeh | G06F 3/0446 345/174 |
| 2013/0342479 A1* | 12/2013 | Pyo | G06F 3/0412 345/173 |
| 2016/0246410 A1* | 8/2016 | Ye | G06F 3/0448 |
| 2017/0160835 A1* | 6/2017 | Zenker | G06F 3/0412 |

FOREIGN PATENT DOCUMENTS

| | | |
|---|---|---|
| CN | 104035638 A | 9/2014 |
| CN | 104035639 A | 9/2014 |
| CN | 104077002 A | 10/2014 |
| CN | 104503638 A | 4/2015 |
| CN | 105022539 A | 11/2015 |
| CN | 105426030 A | 3/2016 |

OTHER PUBLICATIONS

International Search Report dated Jul. 2, 2018, issued in counterpart International Application No. PCT/CN2018/082337. (10 pages).

\* cited by examiner

Prior Art

Fig. 1

Prior Art

First direction

First direction

Fig. 8

SUBSTRATE AND TOUCH DISPLAY APPARATUS

CROSS-REFERENCE TO RELATED APPLICATIONS

This application claims benefit of the filing date of Chinese Patent Application No. 201710740200.4 filed on Aug. 25, 2017, the disclosure of which is hereby incorporated by reference.

TECHNICAL FIELD

This disclosure relates to display technology, and more particularly, to a substrate and a touch display apparatus.

BACKGROUND

With development of technology, capacitive touch panels are more and more widely used. In order to reduce the thickness of panels, the in-cell touch control mode gets wide attention. The in-cell touch control mode includes two modes, Which are self-capacitance touch control mode and mutual capacitance touch control mode.

BRIEF SUMMARY

Accordingly, one example of the present disclosure is a substrate. The substrate may include a plurality of electrode patterns. Each of the plurality of the plurality of electrode patterns may include a first electrode and a plurality of second electrodes connected to the first electrode. A shape of second electrodes of an electrode pattern may be complementary to a shape of second electrodes of at least one electrode pattern adjacent to the electrode pattern.

In one embodiment, among three consecutive rows of the plurality of electrode patterns, a number of second electrodes of an electrode pattern in the middle row and a number of second electrodes of an electrode pattern in the upper row are alternately arranged in a first direction, and a number of the other second electrodes of the electrode pattern in the middle row and a number of second electrodes of an electrode pattern in the lower row are alternately arranged in a second direction.

In one embodiment, n second electrodes of the electrode pattern in the middle row and the second electrodes of the electrode pattern in the upper row are alternatively arranged, and in other second electrodes of the electrode pattern in the middle row and the second electrodes of the electrode pattern in the lower row are alternately arranged, wherein m and n are integers larger than zero.

The first electrode and each of the second electrodes may be strip-shaped electrodes. The plurality of the second electrodes may be disposed respectively on both sides of the first electrode. A length of each of the second electrodes on one side of the first electrode may be the same as a length of each of the second electrodes on the other side of the first electrode. An extending direction of each of the second electrodes on one side of the first electrode may be the same as an extending direction of each of the second electrodes on the other side of the first electrode. In another embodiment, an extending direction of each of the second electrodes on one side of the first electrode may not be the same as an extending direction of each of the second electrodes on the other side of the first electrode. A distance between two adjacent second electrodes on the same side may be in a range of 0.2 mm to 1 mm. Each of the second electrodes respectively disposed on both sides of the first electrode may connect with the first electrode at different location. The first direction may be the same as the second direction. The first electrode may extend in the first direction and each of the second electrodes may extend in a direction perpendicular to the first direction.

Each of the plurality of electrode patterns may further include a plurality of third electrodes connected the second electrodes, and the third electrodes are respectively arranged on both sides of the first electrode. In one embodiment, among four adjacent electrode patterns forming a rectangle, the third electrodes of two electrode patterns located at two diagonal vertices are alternately arranged. Among three consecutive columns of the electrode patterns, a number of third electrodes of an electrode pattern in the middle column and a number of third electrodes of electrode patterns at both sides of the electrode pattern in the middle column may be alternately arranged in a third direction. Each of the third electrodes may be a strip-shaped electrode. Two second electrodes arranged with the third electrodes may be located on both sides of the first electrode respectively.

Another example of the present disclosure is a touch control display apparatus. The touch control display apparatus may include the substrate according to one embodiment of the present disclosure. The touch control display apparatus may further include a driving circuit coupled to each of the electrode patterns respectively. The driving circuit may be configured to provide a common voltage signal to the plurality of electrode patterns during a display stage and to provide a touch signal to the plurality of electrode patterns during a touch stage

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present disclosure will be described in further detail with reference to the accompanying drawings and embodiments in order to provide a better understanding by those skilled in the art of the technical solutions of the present disclosure. Throughout the description of the disclosure, reference is made to FIGS. 1-8. When referring to the figures, like structures and elements shown throughout are indicated with like reference numerals.

In this specification, the tennis "first," "second," and "third" may be added as prefixes. These prefixes, however, are only added in order to distinguish the terms and do not have specific meaning such as order and relative merits.

Figure 1:
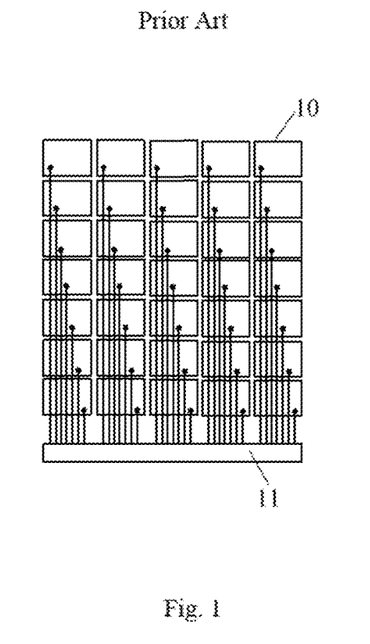
FIG. 1 is a schematic diagram of an arrangement of electrode blocks in a self-capacitance touch panel in the prior art.

In a self-capacitance touch panel, such as the one shown in FIG. 1, a common electrode layer is divided into a plurality of electrode blocks 10. Each of the electrode blocks 10 is connected to a driving chip 11 through a signal line. At a display stage, the electrode blocks 10 serve as common electrodes and receive common voltage signals provided by the driving chip 11. At a touch control stage, the electrode blocks 10 serve as electrode patterns. During a touch control action, due to touch by a user's finger, capacitance of the self-capacitance electrode at the corresponding position is changed. The driving chip can determine the touch position of the finger based on change of the capacitance.

Figure 2:
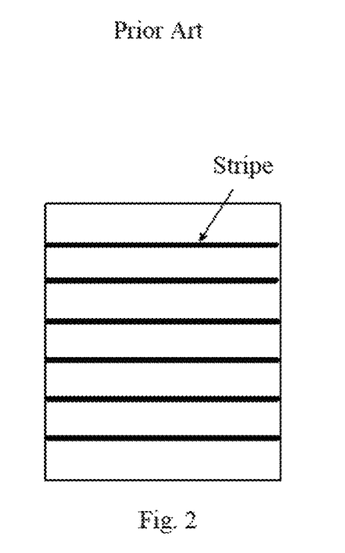
FIG. 2 is a schematic diagram of stripe phenomenon in the prior art.

However, since each of the electrode blocks 10 has a certain size, for instance approximately 6×6 mm in size, lengths of signal lines connected to the two adjacent electrode blocks 10 are different, which leads to different resistance between the two electrode blocks 10 and the driving chip 11. As a result, the common voltages on two adjacent rows of electrode blocks 10 are suddenly changed, and a stripe occurs at an interface of the two adjacent blocks. The stripe has a guy level which is different from that of the upper and lower electrode blocks as shown in FIG. 2. That is, poor stripes are generated.

One example of the present disclosure is a substrate. As shown in FIG. 3 to FIG. 8, the substrate may comprise a plurality of electrode patterns 20. Each of the electrode patterns 20 may comprise a first electrode 21 and a plurality of second electrodes 22 connected to the first electrode 21 and distributed at both sides of the first electrode. As shown in FIG. 4, among any three consecutive rows A, B, C of electrode patterns 20, a number of the second electrodes 22 of the electrode pattern 20 in the middle row B and a number of the second electrodes 22 of the electrode pattern 20 in the upper row A are alternately arranged in a preset first direction. A number of the other second electrodes 22 of the electrode pattern 20 in the middle row B and a number of the second electrodes 22 of the electrode pattern 20 in the lower row C are alternately arranged in a preset second direction. The preset first direction and the preset second direction can be the same or different.

In the prior art, each of the electrode patterns 20 is a block, which leads to relatively obvious difference between common voltages received by the electrode patterns of different rows. As such, strips are usually generated at positions between the adjacent rows. According to one embodiment of the present disclosure, a number of the second electrodes 22 of the electrode patterns 20 of two adjacent rows are alternately arranged. That is, the electrode patterns 20 of two adjacent rows are arranged in an alternating mode. The common voltage in the alternating region could be considered approximately as an average of two common voltages, Vcom 1 and Vcom 2, of the electrode patterns in the two rows respectively. Therefore, in the alternating region of the two adjacent rows of electrode patterns 20, the common voltage is transitioned from Vcom 1 to (Vcom 1+Vcom 2)/2, then to Vcom 2. As such, the common voltages of electrode patterns 20 in different rows are gradually changed, thereby reducing generation of poor strips due to sudden change of common voltages of electrode patterns 20 of different rows.

The alternating arrangement may be a one-to-one alternating mode or a two-two alternating mode. In one embodiment, in order to better average common voltages in the alternating regions, a one-to-one alternating mode is adopted.

Embodiments of the present disclosure are described below with reference to FIGS. 3-8.

Figure 3A:
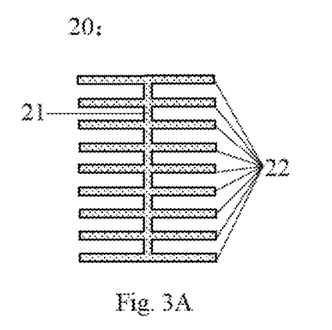
FIG. 3A is a schematic structural diagram of a electrode pattern according to one embodiment of the present disclosure.
Figure 4A:
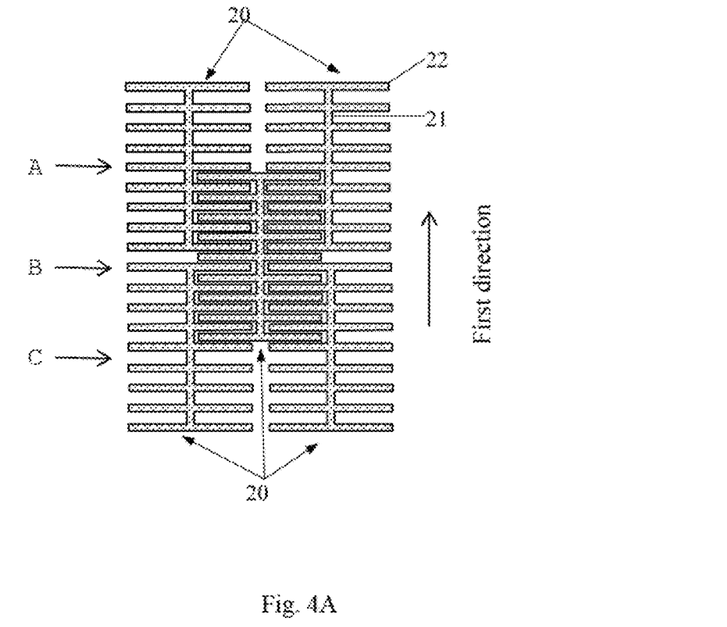
FIG. 4A is a schematic diagram of an arrangement of a plurality of electrode patterns according to one embodiment of the present disclosure.
Figure 4B:
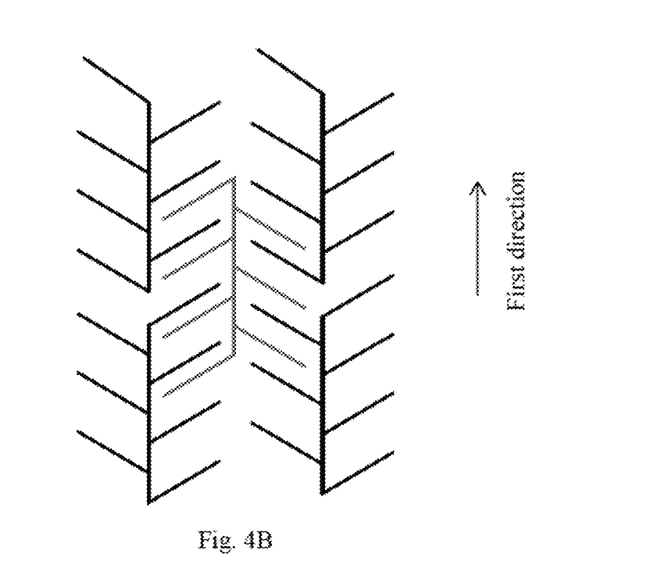
FIG. 4B is a schematic diagram of an arrangement of a plurality of electrode patterns according to one embodiment of the present disclosure.
Figure 4C:
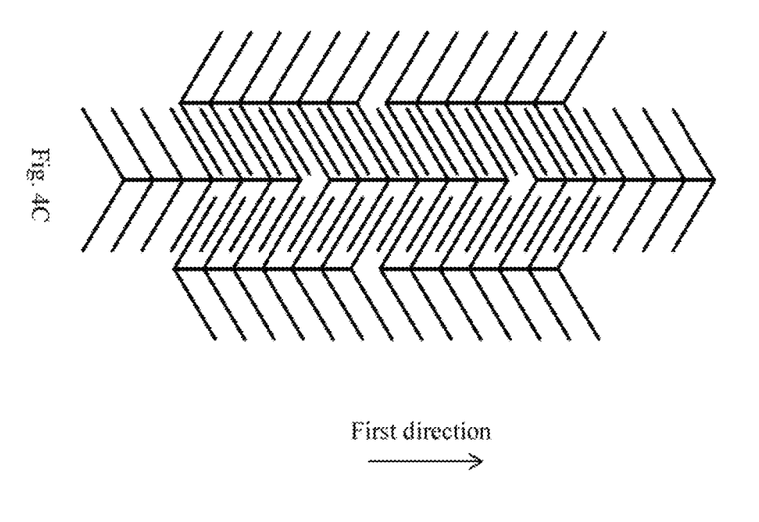
FIG. 4C is a schematic diagram of an arrangement of a plurality of electrode patterns according to one embodiment of the present disclosure.

FIG. 3A shows a structure of an electrode pattern 20 according to one embodiment of the present disclosure. FIG. 4A shows an arrangement of aa plurality of electrode patterns 20 according to one embodiment of the present disclosure. In each of the electrode patterns 20, the first electrode 21 and the second electrode 22 are strip-shaped electrodes. The first electrode 21 extends in a column direction. The extending direction of the second electrode 22 is perpendicular to the extending direction of the first electrode 21. A preset first direction and a preset second direction are the same. Both the preset first direction and the preset second direction are the column direction. That is, the upper half portion of the second electrodes 22 of each electrode pattern 20 in the middle row and the lower half portion of the second electrodes 22 of each electrode pattern 20 in the upper row are alternatively arranged in the column direction. The lower half portion of the second electrodes 22 of each electrode pattern 20 in the middle row and the upper half portion of the second electrodes 22 of each electrode pattern 20 in the lower row are alternatively arranged in the column direction.

In one embodiment, a shape of second electrodes of an electrode pattern is complementary to a shape of second electrodes of at least one electrode pattern adjacent to the electrode pattern. For a pattern with a fixed shape, the orthographic projection of the pattern on a plane has contours or boundaries. "Complementary shapes" herein mean that, for two complementary patterns each having a fixed shape, the projections and depressions of the two patterns can cooperate with each other, or the shapes of the two patterns are approximately the same, or the contours of the orthogonal projections of the two patterns on a plane have substantially the same orientation. For example, each of the two patterns has a shape of comb teeth or fish bone.

In one embodiment, in each electrode pattern 20, a number of the second electrodes 22 located on each side of the first electrode 21 are alternately arranged with the second electrodes 22 of the electrode patterns 20 on both sides of the first electrode 21 respectively.

In one embodiment, as shown in FIG. 3A, the plurality of the second electrodes is disposed respectively on both sides of the first electrode. A length of each of the second electrodes on one side of the first electrode is the same as a length of each of the second electrodes on the other side of the first electrode. An extending direction of each of the second electrodes on one side of the first electrode is the same as an extending direction of each of the second electrodes on the other side of the first electrode. In another embodiment, an extending direction of each of the second electrodes on one side of the first electrode is not the same as an extending direction of each of the second electrodes on the other side of the first electrode. A distance between two adjacent second electrodes on the same side may be in a range of 0.2 mm to 1 mm.

Figure 3B:
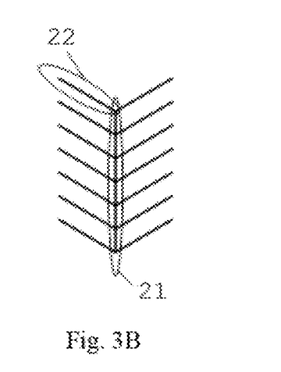
FIG. 3B is a schematic structural diagram of a electrode pattern according to one embodiment of the present disclosure.

In one embodiment, as shown in FIG. 3B, an extending direction of each of the second electrodes respectively on both sides of the first electrode is not the same. In one embodiment, each of the second electrodes respectively disposed on both sides of the first electrode connects with the first electrode at different location, as shown in FIG. 4B.

In, one embodiment, among any three consecutive rows, n second electrodes 27 of each electrode pattern 20 in the middle row and the second electrodes 22 of each electrode pattern 20 in the upper row are alternatively arranged. Furthermore, in other second electrodes 22 of each electrode pattern 20 in the middle row and the second electrodes 22 of each electrode pattern 20 in the lower row are alternately arranged. Both m and n are integers larger U than zero, and the sum of m and n is smaller than or equal to the total number of the second electrodes 22 in the electrode pattern 20. In one embodiment, m=n. With this arrangement mode, sizes of the alternating region between the middle row and the upper row and that between the middle row and the lower row are equal. As such, the common voltages of electrode patterns 20 of multiple rows are transitioned more smoothly, and defects of poor stripe can be reduced.

Figure 5:
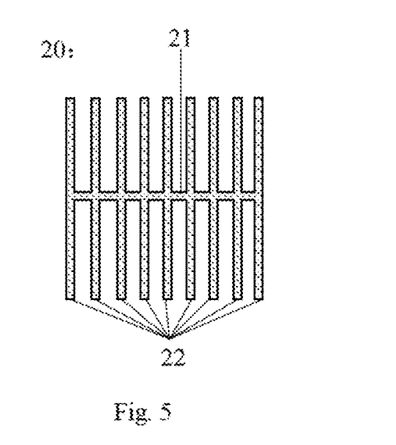
FIG. 5 is a schematic structural diagram of a electrode pattern according to one embodiment of the present disclosure.
Figure 6:
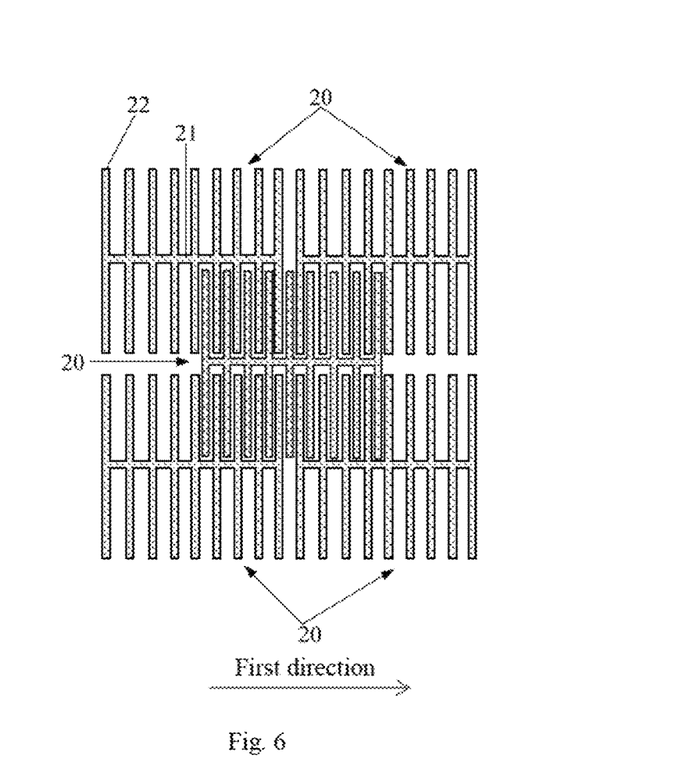
FIG. 6 is a schematic diagram of an arrangement of a plurality of self capacitance electrodes according, to one embodiment of the present disclosure.

FIG. 5 shows a structure of an electrode pattern 20 according to another embodiment of the present disclosure. FIG. 6 shows an arrangement of a plurality of the electrode patterns 20 according to another embodiment of the present disclosure. The difference of implementation between the current embodiment and the previous embodiment is that: the first electrode 21 of the electrode pattern 20 extends in the column direction, and the preset first direction and the preset second direction are all in the row direction. The rest are similar to the previous embodiment. The description is not repeated herein.

Figure 7:
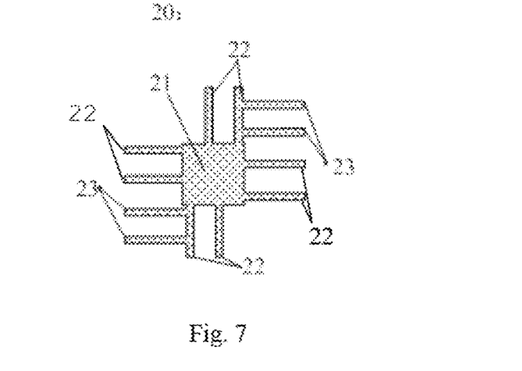
FIG. 7 is a schematic structural diagram of a self-capacitance according to one embodiment of the present disclosure.
Figure 8:
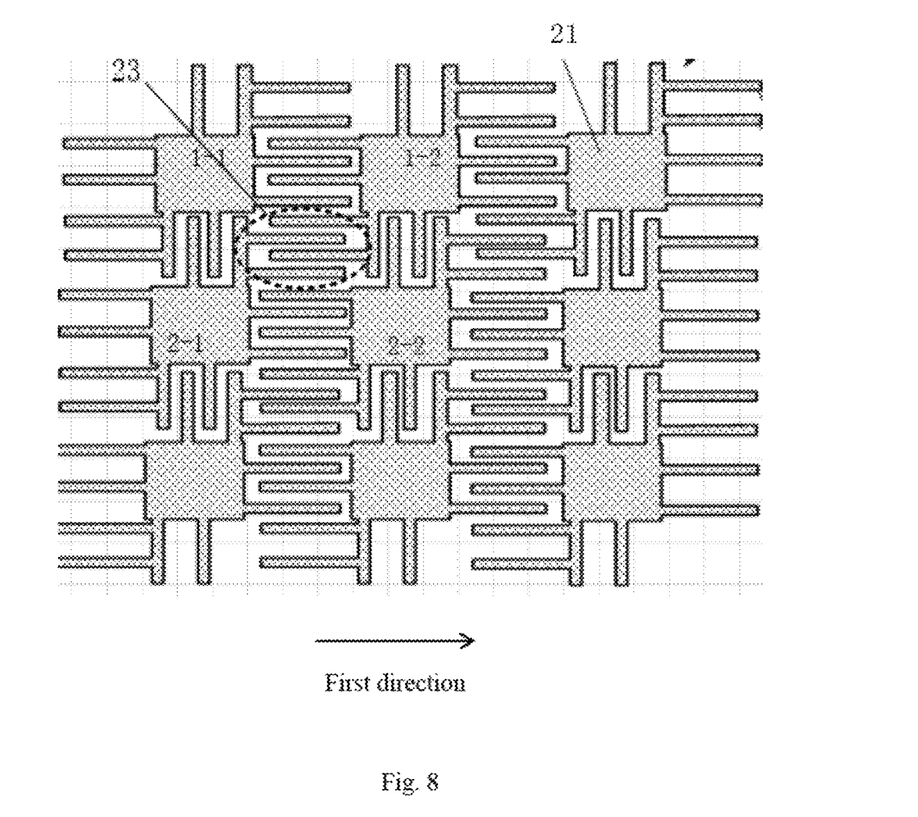
FIG. 8 is a schematic diagram of an arrangement of a plurality of electrode patterns according to one embodiment of the present disclosure.

FIG. 7 shows a structure of an electrode pattern 20 according to another embodiment of the present disclosure. FIG. 8 shows an arrangement of the electrode patterns 20 according to another embodiment of the present disclosure. For the electrode patterns including the third electrodes as shown in FIG. 7, these electrode patterns of the adjacent rows and/or columns can be regularly arranged.

In one embodiment, among four adjacent electrode patterns forming a rectangle, the third electrodes of two electrode patterns located at two diagonal vertices are alternately arranged. For example, as shown in FIG. 8, the four adjacent electrode patterns 1-1, 1-2, 2-1, and 2-2 form a rectangle. The third electrodes of the two electrode patterns 1-1 and 2-2 are alternately arrange, as indicated by the dotted circle.

Among any three consecutive columns, a plurality of third electrodes 23 of each electrode pattern in the middle column and the third electrodes 23 of the electrode patterns 20 at both sides of the middle electrode pattern 20 are alternately arranged in a preset third direction, respectively. As shown in FIG. 8, for each electrode pattern 20 in the middle column, a plurality of third electrodes 23 on the left side of the middle column of the electrode pattern 20 and a plurality of third electrode 23 on the right side of the left-column of the electrode pattern 20 are alternately arranged. A plurality of third electrodes 23 on the right side of the middle column of the electrode pattern 20 and a plurality of third electrodes 23 on the left side of the right column of the electrode pattern 20 are alternately arranged.

Specifically, as shown in FIG. 7 and FIG. 8, second electrodes 22 at the upper side of the first electrode 21 of the electrode pattern 20 in the middle row and the second electrodes 22 of the electrode pattern 20 in the upper row are alternately arranged in the row direction. The second electrodes 22 at the lower side of the first electrode 21 of the electrode pattern 20 in the middle row and the second electrodes 22 of the of electrode pattern 20 in the lower row are alternately arranged in the row direction. The third electrodes 23 of the electrode pattern 20 in the middle column and the third electrodes 23 of the electrode patterns in the left column and the right column are alternately arranged in the column direction, respectively. That is, the preset first direction and the preset second direction are the row directions, and the preset third direction is the column direction.

In one embodiment, the third electrode 23 is a strip-shaped electrode extending in a row direction. The first electrode 21 is a block electrode.

In the above embodiments, the first electrode 21 and the second electrode 22 can be other shapes as long as the alternating arrangement can be met. For example, the second electrode 22 can be in a polyline shape. Alternatively, the width of the first electrode 21 may be increased, and the second electrode 22 may be a triangle shape. As such, a electrode pattern having edges with a saw tooth shape can be formed.

Another example of the present disclosure is a touch display apparatus. The touch display apparatus may comprise a substrate and a touch control driving circuit connected to each of electrode patterns. The touch control driving circuit may provide touch control driving signals to the electrode patterns at a touch control stage, and common voltage signals to the electrode patterns at a display stage.

The touch control display apparatus may be electronic paper, a mobile phone, a tablet computer, a display, a notebook computer, a digital photo frame, a navigator and other products or components with display function.

In one embodiment, due to the fact that the electrode patterns in two adjacent rows in the substrate can be intersected, the common voltage corresponding to the area where the two adjacent rows of electrode patterns are located is not directly transitioned from the VCOM 1 to the VCOM 2, brit from the VCOM 1 to the (VCOM 1+VCOM 2)/2, thereby preventing generation strips due to large change in common voltages of the two adjacent rows. As a result, display effect of the touch display apparatus adopting the substrate is significantly improved.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DESCRIPTION OF SYMBOLS IN THE DRAWINGS

10: electrode block
11: driving chip

20: electrode pattern
21: a first electrode
22: a second electrode
23: a third electrode

What is claimed is:

1. A substrate comprising:
a plurality of electrode patterns; each of the plurality of the plurality of electrode patterns comprising a first electrode and a plurality of second electrodes connected to the first electrode;
wherein a shape of second electrodes of an electrode pattern is complementary to a shape of second electrodes of at least one electrode pattern adjacent to the electrode pattern;
each of the plurality of electrode patterns further comprises a plurality of third electrodes connected the second electrodes, and the third electrodes are respectively arranged on both sides of the first electrode; and
among four adjacent electrode patterns forming a rectangle, the third electrodes of two electrode patterns located at two diagonal vertices are alternately arranged.

2. The substrate according to claim 1,
wherein among three consecutive rows of the plurality of electrode patterns, a number of second electrodes of an electrode pattern in the middle row and a number of second electrodes of an electrode pattern in the upper row are alternately arranged in a first direction, and a number of the other second electrodes of the electrode pattern in the middle row and a number of second electrodes of an electrode pattern in the lower row are alternately arranged in a second direction.

3. The substrate according to claim 1, wherein n second electrodes of the electrode pattern in the middle row and the second electrodes of the electrode pattern in the upper row are alternatively arranged, and in other second electrodes of the electrode pattern in the middle row and the second electrodes of the electrode pattern in the lower row are alternately arranged, wherein in and n are integers larger than zero.

4. The substrate according to claim 1, wherein the first electrode and each of the second electrodes are strip-shaped electrodes.

5. The substrate according to claim 3, wherein the plurality of the second electrodes is disposed respectively on both sides of the first electrode.

6. The substrate according to claim 4, wherein a length of each of the second electrodes on one side of the first electrode is the same as a length of each of the second electrodes on the other side of the first electrode.

7. The substrate according to claim 4, wherein an extending direction of each of the second electrodes on one side of the first electrode is the same as an extending direction of each of the second electrodes on the other side of the first electrode.

8. The substrate according to claim 4, wherein an extending direction of each of the second electrodes on one side of the first electrode is not the same as an extending direction of each of the second electrodes on the other side of the first electrode.

9. The substrate according to claim 1, a distance between two adjacent second electrodes on the same side is in a range of 0.2 mm to 1 mm.

10. The substrate according to claim 4, each of the second electrodes respectively disposed on both sides of the first electrode connects with the first electrode at different location.

11. The substrate according to claim 1, wherein a first direction is the same as a second direction.

12. The substrate according to claim 1, wherein the first electrode extends in a first direction and each of the second electrodes extends in a direction perpendicular to the first direction.

13. The substrate according to claim 1,
wherein among three consecutive columns of the electrode patterns, a number of third electrodes of an electrode pattern in the middle column and a number of third electrodes of electrode patterns at both sides of the electrode pattern in the middle column are alternately arranged in a third direction.

14. The substrate according to claim 1, wherein each of the third electrodes is a strip-shaped electrode.

15. The substrate according to claim 1, wherein two second electrodes arranged with the third electrodes are located on both sides of the first electrode respectively.

16. A touch control display apparatus comprising the substrate according to claim 1.

17. The touch control display apparatus according to claim 16, further comprising a driving circuit coupled to each of the electrode patterns respectively,
wherein the driving circuit is configured to provide a common voltage signal to the plurality of electrode patterns during a display stage and to provide a touch signal to the plurality of electrode patterns during a touch stage.

* * * * *